(No Model.)
J. A. BIDWELL.
AMALGAMATING PAN.
No. 303,693. Patented Aug. 19, 1884.
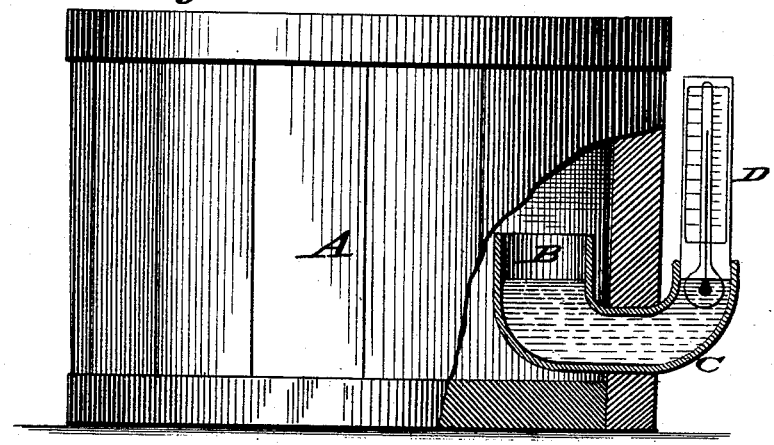
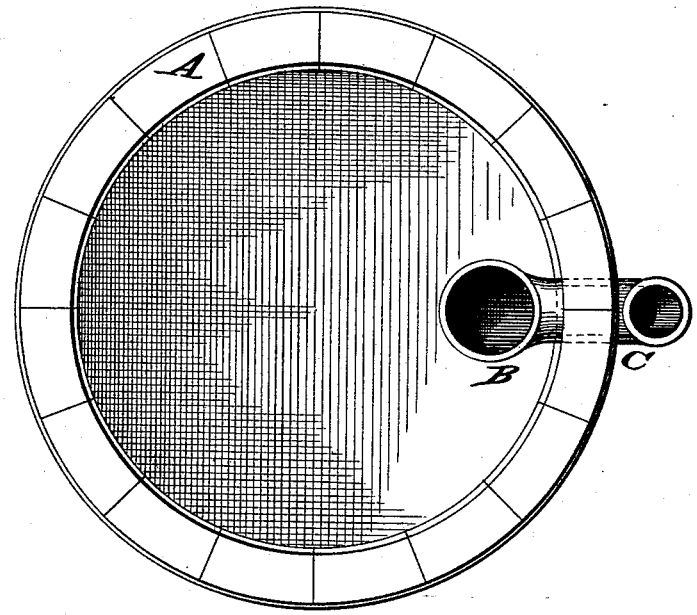
WITNESSES:
Fred. G. Dieterich
Wm. Bagger
INVENTOR.
Julius A. Bidwell,
by Louis Bagger & Co.
ATTORNEYS.

UNITED STATES PATENT OFFICE.

JULIUS A. BIDWELL, OF IVANPAH, CALIFORNIA.

AMALGAMATING-PAN.

SPECIFICATION forming part of Letters Patent No. 303,693, dated August 19, 1884.

Application filed May 13, 1884. (No model.)

*To all whom it may concern:*

Be it known that I, JULIUS A. BIDWELL, a citizen of the United States, and a resident of Ivanpah, in the county of San Bernardino and State of California, have invented certain new and useful Improvements in Amalgamating-Pans; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of an amalgamating-pan, broken away in part to show my improvement; and Fig. 2 is a top or plan view of the same.

Similar letters of reference indicate corresponding parts in both the figures.

In working gold and silver ores by the amalgamating-pan process, salt, sulphate of copper, sulphate of iron, and other chemicals are used, mixed with the quicksilver, and the whole mass of quicksilver-pulp and chemicals is heated by steam. It is found that if too high a degree of heat is used for this purpose, the quicksilver, of which there is usually several hundred pounds in each pan, is acted upon by the salt in such a manner that a large percentage of it is apt to be converted into a protochloride of mercury and carried off in the form of vapor. Experience has demonstrated beyond a doubt that thousands of tons of quicksilver are lost in this way annually. If, on the other hand, too low a degree of heat is used, the amalgamating process is incomplete, and much silver and gold is lost, it being left in the pulp without being extracted therefrom during the amalgamating process. It is therefore very desirable to be able to ascertain, at all stages of the process, the exact heat in the pans; but as the mullers in the amalgamating-pan are usually run at from eighty to one hundred revolutions per minute, it is impossible to get at the degree of heat with a common thermometer by inserting the same into the pan, because the pulp is so agitated and thrown about that it would scald the operator holding the thermometer, besides which the escaping steam, being charged with quicksilver, would be apt to salivate him, thus seriously endangering life and health. It has therefore heretofore been the universal practice in amalgamating-mills to guess at the temperature of the pan by holding the hand over the escaping steam, or by its looks; but it is obvious that in this manner it is impossible to determine the actual degree of heat in the pan with anything like absolute certainty.

The nature of my improvement consists in providing the pan with an apparatus or device by which I get a direct connection between the outside of the pan and the inside pulp, so that I can determine the exact temperature of the latter at any time, and with absolute certainty, without uncovering the pans or coming in contact with the hot steam and mercury issuing therefrom.

In the accompanying drawings, A represents the amalgamating-pan, upon the inside of which, near its bottom, I place a bowl or receptacle, B, made of wood, metal, or other suitable material, and so arranged that it and its contents will be in constant contact with the pulp in the pan. This bowl communicates with the outside of the pan by a curved pipe, C, turned upward on the outside, as shown, so that the bowl and pipe are in the form of an inverted siphon. The bowl B and pipe C are filled with mercury, and the bulb of a thermometer (shown at D) is immersed in the mercury at the outer upwardly-bent end of pipe C. Other material may be used in the bowl and pipe instead of mercury or quicksilver, but I prefer this, first, because, being heavier than the pulp in the pan, it acts as a stopper for the same, and prevents it from flowing out through the bowl and pipe; and, secondly, as it is very dense it is an excellent conductor of heat between the inside of the pan and the bulb of the thermometer immersed therein on the outside.

I am aware that in patents to Malter, No. 299,409, of May 27, 1884, and Howland, No. 244,240, of July 12, 1881, receptacles have been shown connected with the interior of the pan, and allowing the contents of the pan to flow out in them, and I therefore do not wish to claim such construction, broadly; but I am not aware that a curved receptacle or siphon-shaped pipe filled with quicksilver, but not communicating directly with the contents of the pan, has been used; and I therefore claim—

The combination, with an amalgamating-pan, of an inverted-siphon-shaped receptacle or pipe filled with quicksilver, and a thermometer inserted into the outer end of the pipe, as and for the purpose shown and set forth.

In testimony that I claim the foregoing as my own I have hereunto affixed my signature in presence of two witnesses.

JULIUS A. BIDWELL.

Witnesses:
W. S. LAPRAIX,
J. A. KENNISTON.